US009851201B2

United States Patent
Davis et al.

(10) Patent No.: US 9,851,201 B2
(45) Date of Patent: Dec. 26, 2017

(54) METHOD AND APPARATUS FOR USING CEPSTRUM AND WAVELET BASED ALGORITHMS FOR WALL THICKNESS MEASUREMENT

(75) Inventors: Michael A. Davis, Glastonbury, CT (US); Mark A. Foss, Glastonbury, CT (US)

(73) Assignee: CiDRA CORPORATE SERVICES, INC., Wallingford, CT (US)

( * ) Notice: Subject to any disclaimer, the term of this patent is extended or adjusted under 35 U.S.C. 154(b) by 1229 days.

(21) Appl. No.: 13/583,253

(22) PCT Filed: Mar. 9, 2011

(86) PCT No.: PCT/US2011/027749
§ 371 (c)(1),
(2), (4) Date: Nov. 20, 2012

(87) PCT Pub. No.: WO2011/112715
PCT Pub. Date: Sep. 15, 2011

(65) Prior Publication Data
US 2013/0247673 A1    Sep. 26, 2013

Related U.S. Application Data

(60) Provisional application No. 61/311,979, filed on Mar. 9, 2010.

(51) Int. Cl.
G06F 19/00    (2011.01)
G01B 17/02    (2006.01)

(52) U.S. Cl.
CPC .................. G01B 17/02 (2013.01)

(58) Field of Classification Search
CPC ............... G01N 2291/044; G01N 2291/2634
(Continued)

(56) References Cited

U.S. PATENT DOCUMENTS 2,306,651  A    12/1942    Traylor et al.
4,838,086  A     6/1989    Bender et al.
(Continued)

FOREIGN PATENT DOCUMENTS

| GB | 2306651 | 5/1997 |
| WO | 2009111777 | 9/2009 |
| WO | 2009114847 | 9/2009 |

OTHER PUBLICATIONS

Gericke, Otto R., "Cepstral Method for the Measurement of Ultrasonic Pulse Transmission Time Variations," US Army Laboratory Command Materials Technology Laboratory, MTL TR89-25, AD-A207 410, Apr. 1989, 21 pages.

*Primary Examiner* — Edward Raymond
(74) *Attorney, Agent, or Firm* — Ware, Fressola, Maguire & Barber LLP (57) ABSTRACT

New techniques are provided for measuring the thickness of a pipe wall using ultrasonic reflections. The apparatus includes a signal processor that receives a signal containing information about ultrasonic pulses injected into a pipe wall; and determines a pipe wall thickness measurement based at least partly on decomposing the signal received in order to identify either peaks using a cepstrum analysis or repeated spacing using a wavelet analysis. The wavelet analysis includes dividing data in the signal received into a specific frequency component and a defined temporal component in order to detect correct pulses where multiple reflections are caused by irregularities in the pipe wall surface being measured. The cepstrum analysis includes processing repeating pulses in the signal in order to detect correct pulses where multiple reflections are caused by irregularities in the pipe wall surface being measured.

38 Claims, 5 Drawing Sheets

(58) Field of Classification Search
USPC .................................. 702/77, 78, 182–185
See application file for complete search history.

(56) References Cited

U.S. PATENT DOCUMENTS

| | | |
|---|---|---|
| 4,843,884 A | 7/1989 | House et al. |
| 4,881,409 A | 11/1989 | Roarty |
| 5,007,291 A | 4/1991 | Walters et al. |
| 5,416,724 A | 5/1995 | Savic |
| 5,549,004 A | 8/1996 | Nugent |
| 6,000,288 A * | 12/1999 | Kwun .................. G01B 17/00 73/597 |
| 7,194,907 B2 | 3/2007 | Abbate et al. |
| 7,246,522 B1 | 7/2007 | Diaz et al. |
| 7,656,747 B2 | 2/2010 | Mandal et al. |
| 2004/0255678 A1* | 12/2004 | Nagashima et al. ............ 73/620 |
| 2008/0236286 A1 | 10/2008 | Lam et al. |

\* cited by examiner

FIG. 3a: The Basic Process

FIG. 4: Basic Wavelet Analysis Signal Process

*FIG. 7*: Raw ultrasonic signal with multiple reflections

*FIG. 8*: Result after first Fourier transform and transform processing

*FIG. 9*: Result from last Fourier transform and post processing

METHOD AND APPARATUS FOR USING CEPSTRUM AND WAVELET BASED ALGORITHMS FOR WALL THICKNESS MEASUREMENT

CROSS-REFERENCE TO RELATED APPLICATIONS

The present application corresponds to international patent application serial no.: PCT/US11/27749, filed 9 Mar. 2011, which claims the benefit of U.S. Provisional Patent Application No. 61/311,979, filed 9 Mar. 2010, which is incorporated by reference herein in its entirety.

BACKGROUND OF THE INVENTION

1. Technical Field

This invention relates generally to a method and apparatus for measuring the thickness of a pipe wall; and more particularly to a method and apparatus for measuring the thickness of a pipe wall based at least partly on ultrasonic reflections.

2. Description of Related Art

Figure 1A:
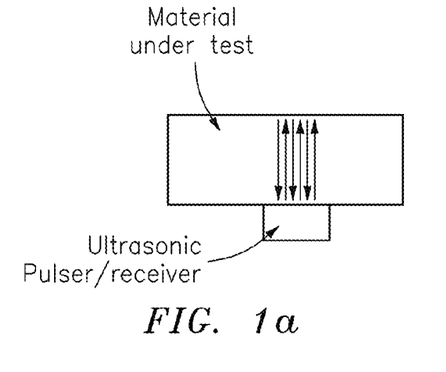
FIG. 1a shows a pipe having a regular material surface; where FIG. 1a' shows a graph of amplitude versus time of reflected ultrasonic pulses related to the pipe shown in FIG. 1a; where
Figure 1B:
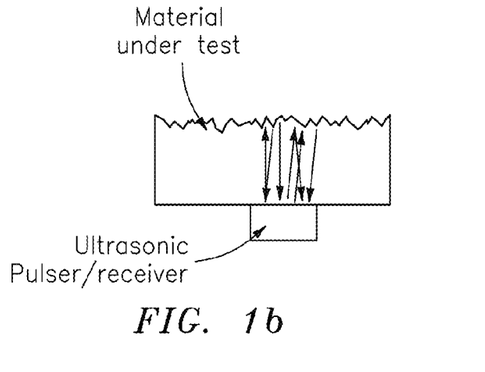
FIG. 1b shows a pipe having an irregular material surface; and where FIG. 1b' shows a graph of amplitude versus time of reflected ultrasonic pulses related to the pipe shown in FIG. 1b.

Processing ultrasonic reflections for the purpose of wall thickness measurements can be particularly challenging when the surfaces being interrogated are not uniform. Typically in such an application an ultrasonic pulse of a particular frequency is injected into the material to be measured from one side. A portion of the ultrasonic pulse will bounce back and forth within the material due to impedance mismatches at the material boundaries. These pulses can be detected and the time between each pulse measured to give the thickness of the material. However, detecting the correct pulses can be difficult in situations where multiple reflections occur such as when the surfaces of the material being measured are irregular. FIG. 1 shows the two potential conditions. FIG. 1a shows a material having a regular surface that provides clear pulses shown in FIG. 1a' that are easy to detect, FIG. 1b shows a material having an irregular inner surface that provides multiple reflections which are more complicated to detect as shown in FIG. 1b'.

Traditional peak detection or correlation detection techniques can have a very difficult time detecting the pulses accurately in the presence of the multiple reflections, each of which has a slightly different time of arrival. Additionally, Fourier decomposition and filtering analysis techniques have a difficult time helping to resolve the correct peaks since each reflection has the same frequency components as the desired pulses, resulting in limited filtering gain by only reducing other system noise.

Figure 2:
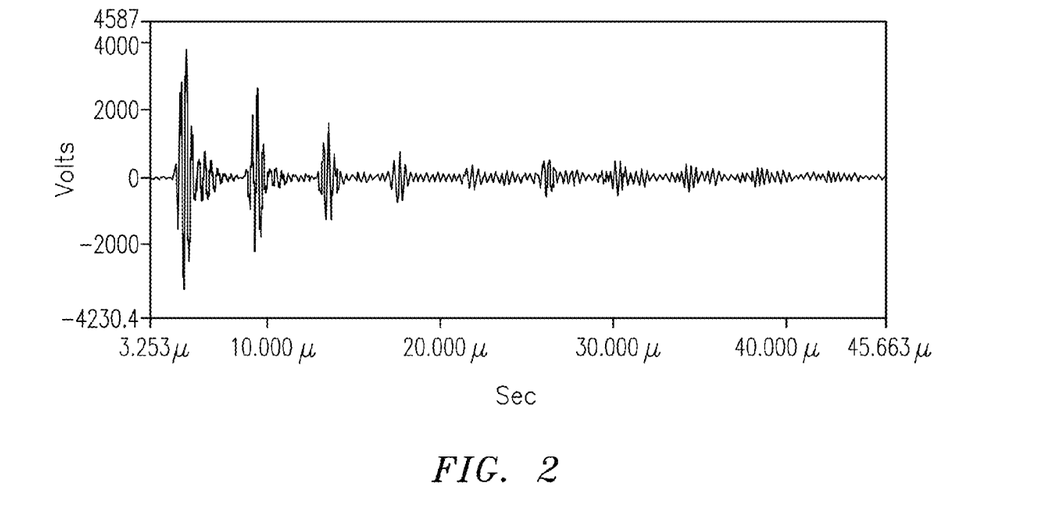
FIG. 2 shows a graph of voltage versus time of a detected signal when an ultrasonic pulse is injected into a pipe with a slightly rough inner surface.

FIG. 2 shows a typical detected signal when an ultrasonic pulse is injected into a pipe with a slightly rough inner surface. The initial pulses can be seen clearly however the multiple reflections quickly engulf the main reflections and toward the end it is difficult to distinguish between the two. As the inner surface of the pipe gets rougher or more irregular, the main pulse signals will decrease drastically in size and it will be difficult to distinguish even the first several pulses.

SUMMARY OF THE INVENTION

In summary, the present invention provides a novel technique for measuring the thickness of a pipe wall, including a method and apparatus for measuring the thickness of a pipe wall based at least partly on ultrasonic reflections. The novel technique according to the present invention takes advantage of the frequency filtering potential, limited duration of each ultrasonic pulse and physical repetition of the pulses that are gained by using wavelet analysis.

According to some embodiments of the present invention, the apparatus may comprise a signal processor configured to receive a signal containing information about ultrasonic pulses injected into a pipe wall; and determine a pipe wall thickness measurement based at least partly on decomposing the signal received in order to identify either peaks using a cepstrum analysis or repeated spacing using a wavelet analysis.

According to some embodiments of the present invention, the signal processor may be configured to perform the wavelet analysis by dividing data in the signal received into at least one specific frequency component and at least one defined temporal component in order to detect correct pulses where multiple reflections are caused by irregularities in the surface of the pipe wall being measured.

According to some embodiments of the present invention, the signal processor may be configured to perform the cepstrum analysis by processing repeating pulses in the signal received in order to detect correct pulses where multiple reflections are caused by irregularities in the surface of the pipe wall being measured.

The signal processor may be configured to provide an output signal containing information about the pipe wall thickness measurement.

Regarding the wavelet analysis, the apparatus may also include one or more of the following features: The signal processor may be configured to determine the pipe wall thickness measurement based at least partly on the time between each pulse detected to give the thickness of the pipe wall. The signal processor may be configured to correlate wavelets based at least partly on a relationship between the at least one specific frequency component and the at least one defined temporal component. The signal processor may be configured to pull true direct reflections out of background noise and multiple odd reflections. The signal may contain information about frequency encode ultrasonic pulses injected in the pipe wall, and the signal processor may be configured to use corresponding wavelets to reduce the signal-to-noise ratio in the signal received. The ultrasonic pulse having a particular frequency may be injected into the pipe wall.

Regarding the cepstrum analysis, the apparatus may also include one or more of the following features: The signal processor may be configured to transform the signal received from the time domain into the frequency domain using a Fourier transform into a Fourier transform signal. The signal processor is configured to prepare spectral information in the Fourier transform signal so as to provide a prepared transform signal, including performing some combination of using a dc-adjusted power cepstrum to calculate a power spectrum from an output of the Fourier transform; filter a resulting signal with a low pass filter to remove a DC offset; square a resulting filtered signal and take a logarithm of a resulting squared signal. The signal processor may be configured to transform the prepared transformed signal using a second Fourier transform so as to provide a second Fourier transform signal. The signal processor may be configured to perform post processing on the second Fourier transform signal into a post processed signal by filtering the second Fourier transform signal using a bandpass filter, including also squaring a filtered second Fourier transform signal to enhance signal peaks. The signal processor may be configured to perform peak identification to identify a most probable pipe wall thickness measurement based at least partly on a peak of the post processed signal. The signal processor may be configured to perform some combination of using a dc-adjusted power cepstrum to separate real portions of an output of the Fourier transform; filter a resulting signal with a low pass filter to remove a DC offset; square a resulting filtered signal and take either a logarithm or a square root of a resulting squared signal to compress peaks in the Fourier transform signal. The signal processor may be configured to determine a final cepstrum output based at least partly on a highest value or an integration based overall "energy" determination.

According to some embodiments of the present invention, the ultrasonic pulse may be injected into the pipe wall from one side.

According to some embodiments of the present invention, the apparatus may comprise an ultrasonic pulser/receiver configured to inject the ultrasonic pulses into the pipe wall from one side, to receive reflected pulses related to the ultrasonic pulse injected into the pipe wall, and to provide an ultrasonic pulser/receiver signal containing information about the reflected pulses related to the ultrasonic pulses injected into the pipe wall.

According to some embodiments of the present invention, the method may comprise steps for receiving a signal containing information about ultrasonic pulses injected into a pipe wall; and determining a pipe wall thickness measurement based at least partly on decomposing the signal received in order to identify either peaks using a cepstrum analysis or repeated spacing using a wavelet analysis.

According to some embodiments of the present invention, the method may comprise performing the wavelet analysis by dividing data in the signal received into at least one specific frequency component and at least one defined temporal component in order to detect correct pulses where multiple reflections are caused by irregularities in the surface of the pipe wall being measured.

The method may also include one or more other steps set forth herein, including a step for providing an output signal containing information about the pipe wall thickness measurement; a step for determining the pipe wall thickness measurement based at least partly on the time between each pulse detected to give the thickness of the pipe wall; or a step for correlating wavelets based at least partly on a relationship between the at least one specific frequency component and the at least one defined temporal component; a step for pulling true direct reflections out of background noise and multiple odd reflections.

According to some embodiments of the present invention, in the method the signal may contain information about frequency encode ultrasonic pulses injected in the pipe wall, and the signal processor is configured to use corresponding wavelets to reduce the signal-to-noise ratio in the signal received; the ultrasonic pulse may be injected into the pipe wall has a particular frequency; and/or the ultrasonic pulse may be injected into the pipe wall from one side.

According to some embodiments of the present invention, the method may include injecting with an ultrasonic pulser/receiver the ultrasonic pulses into the pipe wall from one side, receiving reflected pulses related to the ultrasonic pulse injected into the pipe wall, and providing an ultrasonic pulser/receiver signal containing information about the reflected pulses related to the ultrasonic pulses injected into the pipe wall.

According to some embodiments of the present invention, the method may comprise performing the cepstrum analysis by processing repeating pulses in the signal received in order to detect correct pulses where multiple reflections are caused by irregularities in the surface of the pipe wall being measured.

The method may also include one or more of the following features, including a step for transforming the signal received from the time domain into the frequency domain using a Fourier transform into a Fourier transform signal; a step for preparing spectral information in the Fourier transform signal so as to provide a prepared transform signal, including performing some combination of using a dc-adjusted power cepstrum to calculate a power spectrum from an output of the Fourier transform; filter a resulting signal with a low pass filter to remove a DC offset; square a resulting filtered signal and take a logarithm of a resulting squared signal; a steps for transforming the prepared transformed signal using a second Fourier transform so as to provide a second Fourier transform signal; a step for performing post processing on the second Fourier transform signal into a post processed signal by filtering the second Fourier transform signal using a bandpass filter, including also squaring a filtered second Fourier transform signal to enhance signal peaks; a step for performing peak identification to identify a most probable pipe wall thickness measurement based at least partly on a peak of the post processed signal; a step for performing some combination of using a dc-adjusted power cepstrum to separate real portions of an output of the Fourier transform; filter a resulting signal with a low pass filter to remove a DC offset; square a resulting filtered signal and take either a logarithm or a square root of a resulting squared signal to compress peaks in the Fourier transform signal; and/or a step for determining a final cepstrum output based at least partly on a highest value or an integration based overall "energy" determination.

According to some embodiments of the present invention, the apparatus may comprise means for receiving a signal containing information about ultrasonic pulses injected into a pipe wall; and means for determining a pipe wall thickness measurement based at least partly on decomposing the signal received in order to identify either peaks using a cepstrum analysis or repeated spacing using a wavelet analysis, consistent with that shown and described herein. The apparatus may comprise means for performing the wavelet analysis by dividing data in the signal received into at least one specific frequency component and at least one defined temporal component in order to detect correct pulses where multiple reflections are caused by irregularities in the surface of the pipe wall being measured, consistent with that shown and described in the present application. The apparatus may comprise means for performing the cepstrum analysis by processing repeating pulses in the signal received in order to detect correct pulses where multiple reflections are caused by irregularities in the surface of the pipe wall being measured. The apparatus may also include means for providing an output signal containing information about the pipe wall thickness measurement, including signal processing means.

Some advantages of the present invention include the fact that wavelets are somewhat similar to Fourier analysis in that wavelet techniques divide the data into frequency components; however they also have a temporal component and therefore have the advantage in analyzing signals with discontinuities, sharp spikes or pulses. More specifically, wavelets are approximating functions that fit in finite domains. As such, they can seek out signals that have both a specific frequency component as well as a defined temporal component.

BRIEF DESCRIPTION OF THE DRAWING

Referring now to the drawing, the foregoing and other features and advantages of the present invention will be more fully understood from the following detailed description of illustrative embodiments, taken in conjunction with the accompanying drawing in which like elements are numbered alike:

FIG. 1 includes FIGS. 1a, 1a', 1b, 1b', where

DETAILED DESCRIPTION OF THE INVENTION

The present invention provides a new method and apparatus for using cepstrum and wavelet based algorithms or techniques for wall thickness measurement, that takes advantage of the frequency filtering potential, limited duration of each ultrasonic pulse and physical repetition of the pulses in order to detect correct pulses where multiple reflections are caused by irregularities in the surface of a pipe wall being measured.

Figure 3A:
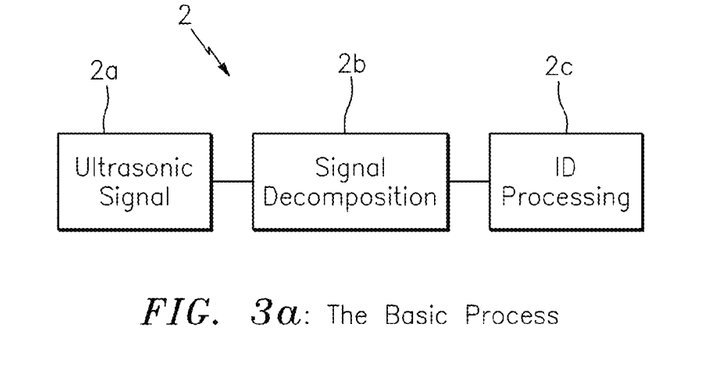
FIG. 3a is a block diagram of the basic process according to some embodiments the present invention.
Figure 3B:
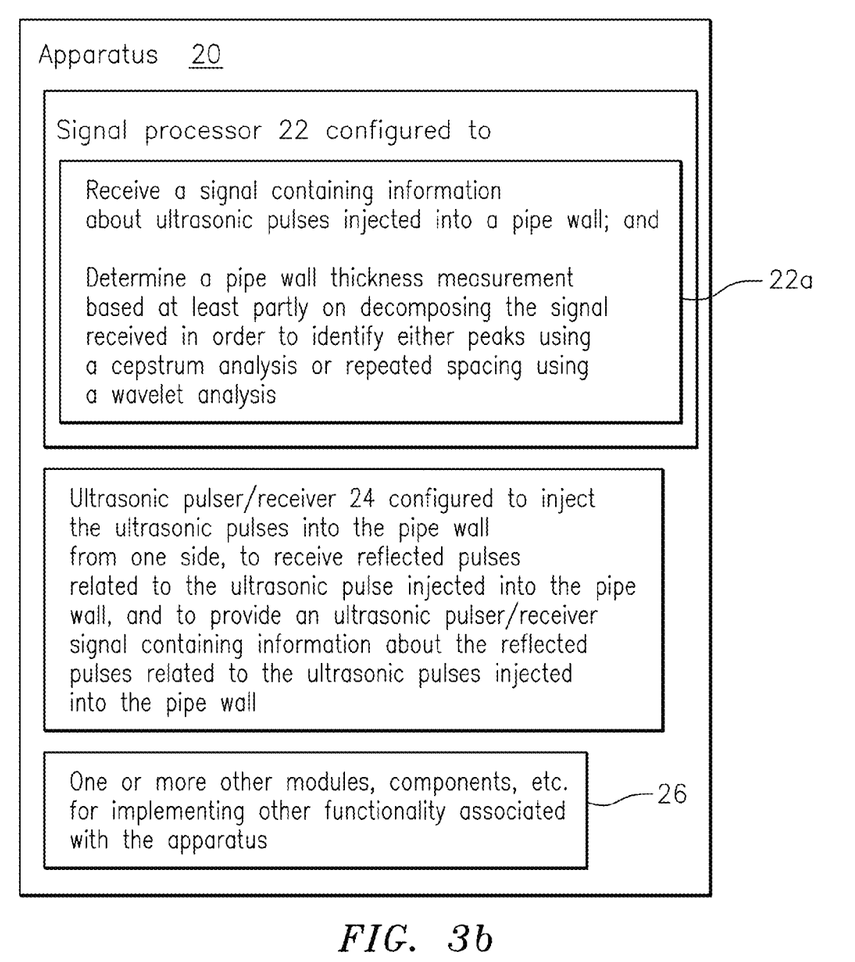
FIG. 3b is a block diagram of apparatus according to some embodiments the present invention.

FIG. 3a shows a flowchart generally indicated as 2 of a basic process for implementing the cepstrum and wavelet based algorithms or techniques for wall thickness measurement according to some embodiments of the present invention, including a step 2a related to an ultrasonic signal, a step 2b related to a signal decomposition and a step 2c related to identification (ID) processing. FIG. 3b shows, by way of example, apparatus generally indicated as 20 according to some embodiments of the present invention. In FIG. 3b, the apparatus 20 includes a signal processor 22, an ultrasonic pulser/receiver 24 and one or more other modules, components, etc. 26.

The signal processor 22 is configured to receive a signal containing information about ultrasonic pulses injected into a pipe wall; and determine a pipe wall thickness measurement based at least partly on decomposing the signal received in order to identify either peaks using a cepstrum analysis or repeated spacing using a wavelet analysis, consistent with that shown in the signal processing block 22a in FIG. 3b.

According to some embodiments, the signal processor 22 may be configured to perform the wavelet analysis by dividing data in the signal received into at least one specific frequency component and at least one defined temporal component in order to detect correct pulses where multiple reflections are caused by irregularities in the surface of the pipe wall being measured, consistent with that shown and described in relation to FIGS. 4-5 below.

According to some embodiments, the signal processor 22 may be configured to perform the cepstrum analysis by processing repeating pulses in the signal received in order to detect correct pulses where multiple reflections are caused by irregularities in the surface of the pipe wall being measured, consistent with that shown and described in relation to FIGS. 6-9 below.

By way of example, the functionality of the signal processor 22 may be implemented using hardware, software, firmware, or a combination thereof, for implementing the functionality of the signal processing block 22a. In a typical software implementation, the signal processor 22 may include one or more microprocessor-based architectures having, e.g., at least one processor or microprocessor, random access memory (RAM) and/or read only memory (ROM), input/output devices and control, and data and address buses connecting the same, and/or at least one input processor and at least one output processor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the signal processor as stand-alone processor or processor module, as separate processor or processor modules, as well as some combination thereof.

The signal processor 22 may be also configured to provide an output signal containing information about the pipe wall thickness measurement.

According to some embodiments of the present invention, the apparatus 20 may also comprise the ultrasonic pulser/receiver 24, which is configured to inject the ultrasonic pulses into the pipe wall from one side, to receive reflected pulses related to the ultrasonic pulse injected into the pipe wall, and to provide an ultrasonic pulser/receiver signal containing information about the reflected pulses related to the ultrasonic pulses injected into the pipe wall. The ultrasonic pulser/receiver signal may be provided to the signal processor 22 for processing using the cepstrum or wavelet analysis as described herein. Ultrasonic pulser/receivers like element 24 are known in the art, and the scope of the invention is not intended to be limited to any particular type or kind thereof either now known or later developed in the future.

Figure 3C:
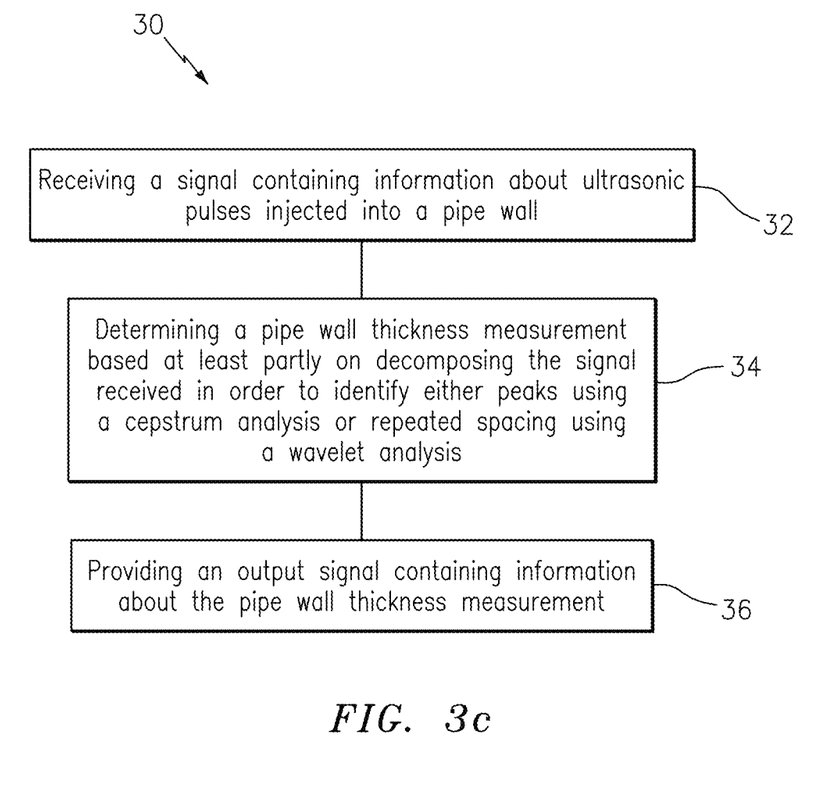
FIG. 3c is a block diagram of a flowchart of a method according to some embodiments the present invention.

FIG. 3c shows a block diagram of a flowchart 30 having basic steps 32, 34, 36 for implementing the signal processing functionality according to some embodiments of the present invention. For example, the method may comprise a step 32 for receiving a signal containing information about ultrasonic pulses injected into a pipe wall; and a step 34 for determining a pipe wall thickness measurement based at least partly on decomposing the signal received in order to identify either peaks using a cepstrum analysis or repeated spacing using a wavelet analysis The method may also comprise a step for performing the wavelet analysis by dividing data in the signal received into at least one specific frequency component and at least one defined temporal component in order to detect correct pulses where multiple reflections are caused by irregularities in the surface of the pipe wall being measured.

The method may also comprise a step for performing the cepstrum analysis by processing repeating pulses in the signal received in order to detect correct pulses where multiple reflections are caused by irregularities in the surface of the pipe wall being measured The method may also comprise a step 36 for providing an output signal containing information about the pipe wall thickness measurement.

The apparatus 20 may also include one or more other modules, components, circuits, etc. generally indicated as 26 for implementing other functionality associated with the operation and workability of apparatus, but that do not form part of the underlying invention and are thus not described in detail, including modules or components for implementing input/output functionality, memory functionality and busing and address functionality associated with the processing of such the signal or signals received by the signal processor from the ultrasonic pulser/receiver.

Figure 4:
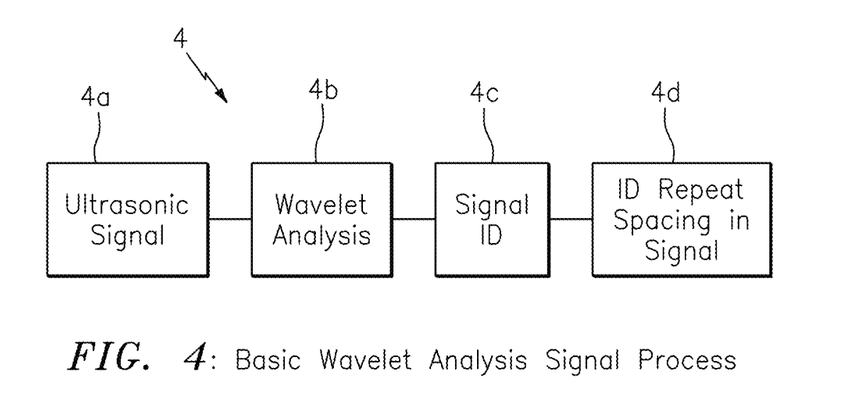
FIG. 4 is a block diagram of the basic wavelet analysis signal process according to some embodiments the present invention.
Figure 5:
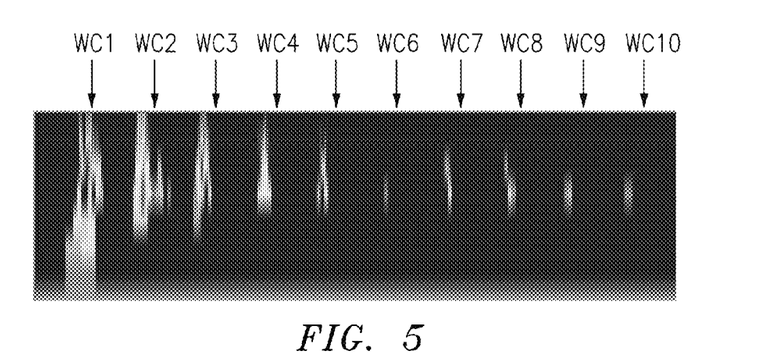
FIG. 5 shows an illustration in of a HAAR wavelet analysis of the data in FIG. 2, as a pdf copy of an original color graph.

FIGS. 4-5

Wavelet Analysis

FIG. 4 shows a flowchart generally indicated as 4 in a basic wavelet analysis signal process for implementing the wavelet based algorithm or technique for wall thickness measurement, including a step 4a related to an ultrasonic signal, a step 4b related to a wavelet analysis for performing the step 2b for signal decomposition in FIG. 3a, a step 4c related to a signal identification (ID) and a step 4d related to identifying (ID) repeat spacing in the signal received, where steps 4c and 4d are for performing the step 2c for ID processing in FIG. 3a.

Figure 5A:
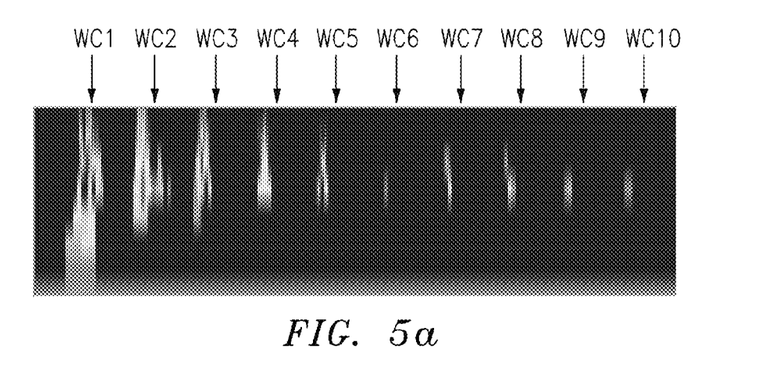
FIG. 5a shows an illustration of a HAAR wavelet analysis of the data in FIG. 2 in gray scale.
Figure 5B:
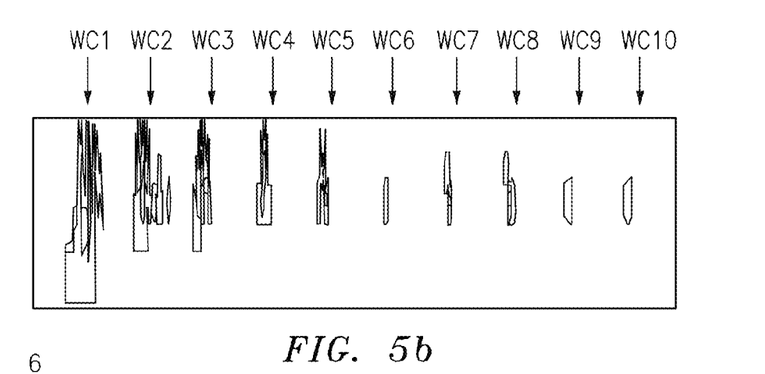
FIG. 5b shows an illustration of the HAAR wavelet analysis of the data in FIG. 2 in line art.

FIG. 5 shows a HAAR wavelet analysis of the FIG. 2 data, and is a 3-D representation of the results from the wavelet analysis with the vertical axis in frequency and the horizontal axis in time (roughly the same scale as in FIG. 2 for the time axis). (In comparison, FIG. 5a shows the HAAR wavelet analysis of the FIG. 2 data in gray scale, while FIG. 5b shows the HAAR wavelet analysis of the FIG. 2 data in line art.) In the Figures, the reference arrows wc1, wc2, . . . , wc9, wc10 point to and represent wavelet correlations, with the lowest wavelet correlations represented by slightly darker shading (in the color blue, if a color graph were permitted to be filed) in each pulse and the highest wavelet correlations represented by lighter or bright shading (in the color red, if a color graph were permitted to be filed) in each pulse. In the Figures, the more pronounced pulses in the beginning of the trace, including wc1, wc2, wc3, wc4, wc5, are clearly and easily seen; however, the weaker pulses toward the end of the trace, including wc6, wc7, wc8, wc9, wc10, are also detected. Here, the wavelet analysis was able to pull the true direct reflections out of the background noise and multiple odd reflections.

While the aforementioned example provided demonstrates how wavelets can be used to help detect and locate pulses, variations on the type of wavelet analysis can also be envisioned, e.g., where the pulses are frequency encoded and corresponding wavelets are used can also potentially help reduce the signal-to-noise ratio of the pulse detection.

Other features of the present invention may include one or more of the following: For example, the signal processor 22 may be configured to determine the pipe wall thickness measurement based at least partly on the time between each pulse detected to give the thickness of the pipe wall. The signal processor 22 may be configured to correlate wavelets based at least partly on a relationship between the at least one specific frequency component and the at least one defined temporal component. The signal processor 22 may be configured to pull true direct reflections out of background noise and multiple odd reflections. The ultrasonic pulse having a particular frequency may be injected into the pipe wall. The ultrasonic pulse may be injected into the pipe wall from one side.

The Method

According to some embodiments of the present invention, the method may also include one or more other steps set forth herein, including a step for determining the pipe wall thickness measurement based at least partly on the time between each pulse detected to give the thickness of the pipe wall; or a step for correlating wavelets based at least partly on a relationship between the at least one specific frequency component and the at least one defined temporal component; and/or a step for pulling true direct reflections out of background noise and multiple odd reflections.

Moreover, according to some embodiments of the present invention, the method may be implemented in relation to a signal being received that contains information about frequency encode ultrasonic pulses injected in the pipe wall, where the signal processor is configured to use corresponding wavelets to reduce the signal-to-noise ratio in the signal received. The method may be implemented in relation to the ultrasonic pulse being injected into the pipe wall with a particular frequency and/or the ultrasonic pulse being injected into the pipe wall from one side (See, e.g., the arrangement of the ultrasonic pulser/receiver and the material under test in FIGS. 1a, 1b).

Moreover still, according to some embodiments of the present invention, the method may be implemented with steps for injecting with an ultrasonic pulser/receiver the ultrasonic pulses into the pipe wall from one side, receiving reflected pulses related to the ultrasonic pulse injected into the pipe wall, and providing an ultrasonic pulser/receiver signal containing information about the reflected pulses related to the ultrasonic pulses injected into the pipe wall.

FIGS. 6-9

Cepstrum Analysis of Ultrasonic Signals for the Determination of Wall Thickness

Figure 6:
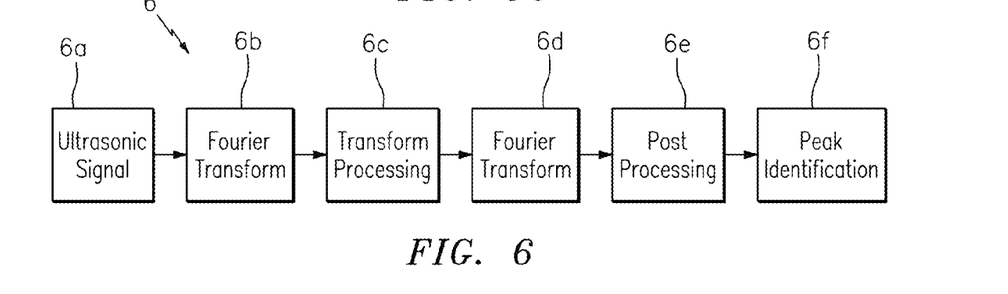
FIG. 6 is a block diagram of a flowchart showing a basic process for signal processing according to some embodiments the present invention.

In addition to the above mentioned technique related to wavelet analysis, an alternative method involves a Fourier analysis of the spectrum of ultrasonic signals called cepstrum analysis. Typically, cepstrum analysis is used in applications for image processing or speech analysis. According to the present invention, various cepstrum algorithms may be used for the processing of the repeating pulses that are present in reflecting ultrasonic signals, consistent with that described below:

FIG. 6 shows, by way of example, a flowchart of the basic process for cepstrum analysis, including a step 6a related to an ultrasonic signal; a step 6b related to a Fourier transform; a step 6c related to transform processing; a step 6d related to a second Fourier transform; a step 6e related to post processing; and a step 6f related to peak identification. For example, the measured ultrasonic signal is first taken in step 6a and then passed through a Fourier transform in step 6b. Following the first transform, a processing step occurs in step 6c which prepares the spectral information for the following additional Fourier transform. This process in step 6c can involve a number of steps which can be tailored to the signal and application. The following sequence can be used for a DC-adjusted power cepstrum:

1. Calculate power spectrum from output of Fourier transform,
2. Low pass filter result to remove DC offset,
3. Square result, and
4. Take logarithm of squared result.

In the processing of ultrasonic signals, the low pass filter step can be crucial to improving the accuracy of the final calculated measurement. This filtering step will allow the next step of squaring of the signal to improve the resolution of the important spectral peaks to the noise valleys. After the transform processing is complete a second Fourier transform is taken in step 6d followed by signal post processing in step 6e and peak identification in step 6f. The post processing step 6e usually involves a signal bandpass filter to help the final peak identification and possibly a square operation to enhance the signal peaks. The purpose of the peak identification step 6f is to identify the most probable wall thickness based on the peak of the signal obtained from the post processing step.

Several different transform processing algorithms can be used to help tailor the cepstrum for identification of wall thickness based ultrasonic signals. One alternative involves using the real portion of the initial Fourier transform rather than the power spectrum in sub-step 1 of in step 6c above. Additionally in sub-step 4 in step 6c above instead of a logarithm being taken a square root can be performed to help compress the peaks of the first transform (which effectively cancels the square in sub-step 3 in step 6c). In such cases the order of steps may be:

1. Separate real portion of Fourier transform,
2. Low pass filter result to remove DC offset,
3. Square result, and
4. Take logarithm of squared result.

Alternatively, the order of steps may be:

1. Calculate power spectrum from output of Fourier transform, and
2. Low pass filter result to remove DC offset Additionally, a variety of peak detection methods can be used in step 6f to determine the final cepstrum output. This may include techniques such as highest value or integration based overall "energy" determination.

Figure 7:
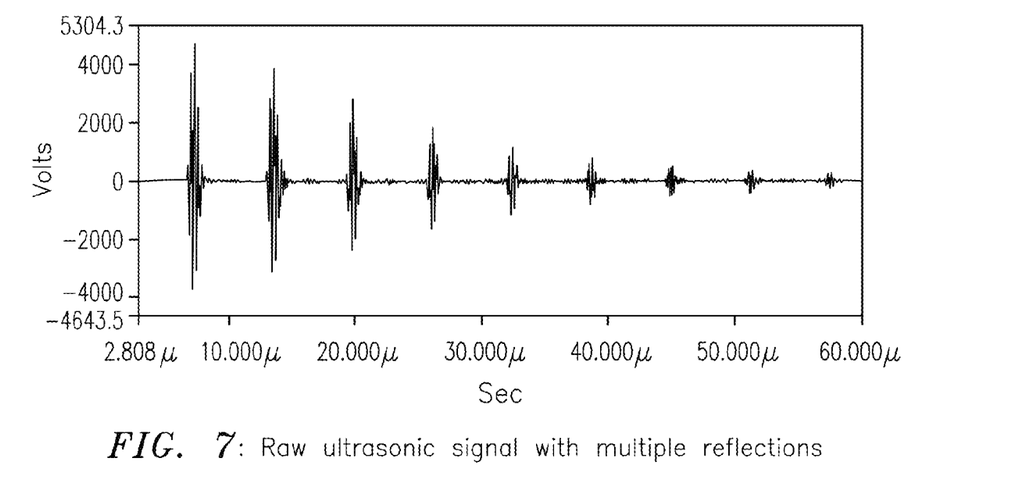
FIG. 7 shows an illustration of a raw ultrasonic signal with multiple reflections.
Figure 8:
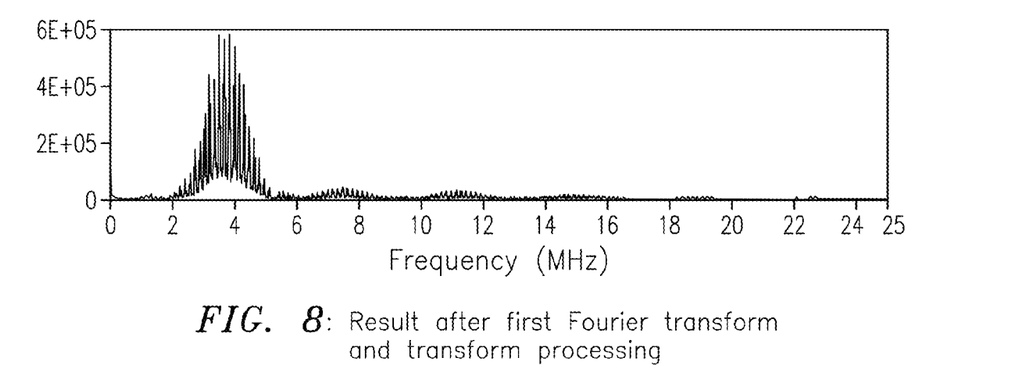
FIG. 8 shows an illustration of a result after a first Fourier transform and transform processing.
Figure 9:
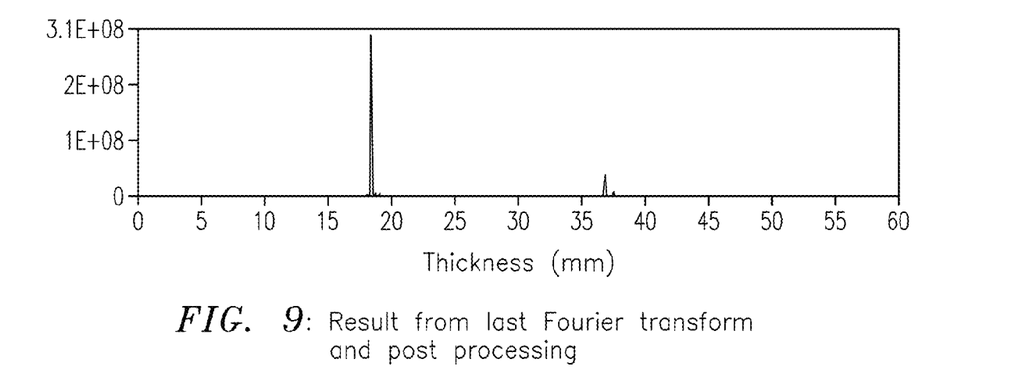
FIG. 9 shows an illustration of a result after a last Fourier transform and post processing.

FIGS. 7-9 show some typical signals as the raw ultrasonic signals are transformed through the cepstrum process until it reaches the final peak detection stage.

Computer Program Code

It should be appreciated that according to some embodiments the present invention may be implemented, and can be embodied, in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The Scope of the Invention

The present invention is described herein by way of example using wavelet and cepstrum analysis for signal processing and decomposition. However, the scope of the invention is intended to include other type or kind of techniques for signal processing and decomposition both now known and later developed in the future within the spirit of implementing the underlying invention.

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. Apparatus comprising:
   an ultrasonic pulser/receiver configured to
      inject ultrasonic pulses into a pipe wall from one side,
      receive reflected pulses in response to the ultrasonic pulses injected, and
      provide an ultrasonic pulser/receiver signal containing information about the reflected pulses received; and
   a signal processor configured to:
      receive the ultrasonic pulser/receiver signal; and
      determine a corresponding signal containing information about a pipe wall thickness measurement by decomposing the ultrasonic pulser/receiver signal received in order to identify either peaks using a cepstrum analysis or repeated spacing using a wavelet analysis, based upon the ultrasonic pulser/receiver signal received.

2. Apparatus according to claim 1, wherein the signal processor is configured to provide an output signal containing information about the pipe wall thickness measurement.

3. Apparatus according to claim 1, wherein the signal processor is configured to perform the wavelet analysis by dividing data contained in the ultrasonic pulser/receiver signal received into at least one specific frequency component and at least one defined temporal component in order to detect correct pulses where multiple reflections are caused by irregularities in the surface of the pipe wall being measured.

4. Apparatus according to claim 1, wherein the signal processor is configured to determine the pipe wall thickness measurement based at least partly on the time between each pulse detected to give the thickness of the pipe wall.

5. Apparatus according to claim 2, wherein the signal processor is configured to correlate wavelets based at least partly on a relationship between the at least one specific frequency component and the at least one defined temporal component.

6. Apparatus according to claim 1, wherein the signal processor is configured to pull true direct reflections out of background noise and multiple odd reflections.

7. Apparatus according to claim 1, wherein the ultrasonic pulser/receiver signal contains information about frequency encode ultrasonic pulses injected in the pipe wall, and the signal processor is configured to use corresponding wavelets to reduce the signal-to-noise ratio in the ultrasonic pulser/receiver signal received.

8. Apparatus according to claim 1, wherein the ultrasonic pulses injected into the pipe wall have a particular frequency.

9. Apparatus according to claim 1, wherein the ultrasonic pulses are injected into the pipe wall from one side.

10. Apparatus according to claim 1, wherein the signal processor is configured to perform the cepstrum analysis by processing repeating pulses in the ultrasonic pulser/receiver signal received in order to detect correct pulses where multiple reflections are caused by irregularities in the surface of the pipe wall being measured.

11. Apparatus according to claim 10, wherein the signal processor is configured to transform the ultrasonic pulser/receiver signal received from the time domain into the frequency domain using a Fourier transform into a Fourier transform signal.

12. Apparatus according to claim 11, wherein the signal processor is configured to prepare spectral information in the Fourier transform signal so as to provide a prepared transform signal, including performing some combination of using a dc-adjusted power cepstrum to calculate a power spectrum from an output of the Fourier transform; filter a resulting signal with a low pass filter to remove a DC offset; square a resulting filtered signal and take a logarithm of a resulting squared signal.

13. Apparatus according to claim 12, wherein the signal processor is configured to transform the prepared transformed signal using a second Fourier transform so as to provide a second Fourier transform signal.

14. Apparatus according to claim 13, wherein the signal processor is configured to perform post processing on the second Fourier transform signal into a post processed signal by filtering the second Fourier transform signal using a bandpass filter, including also squaring a filtered second Fourier transform signal to enhance signal peaks.

15. Apparatus according to claim 14, wherein the signal processor is configured to perform peak identification to identify a most probable pipe wall thickness measurement based at least partly on a peak of the post processed signal.

16. Apparatus according to claim 11, wherein the signal processor is configured to perform some combination of using a dc-adjusted power cepstrum to separate real portions of an output of the Fourier transform; filter a resulting signal with a low pass filter to remove a DC offset; square a resulting filtered signal and take either a logarithm or a square root of a resulting squared signal to compress peaks in the Fourier transform signal.

17. Apparatus according to claim 10, wherein the signal processor is configured to determine a final cepstrum output based at least partly on a highest value or an integration based overall "energy" determination.

18. A method comprising:
   injecting with an ultrasonic pulser/receiver ultrasonic pulses into a pipe wall;
   receiving with the ultrasonic pulser/receiver reflected pulses in response to the ultrasonic pulses injected;
   providing with the ultrasonic pulser/receiver an ultrasonic pulser/receiver signal containing information about the reflected pulses received;
   receiving with a signal processor the ultrasonic pulser/receiver signal; and
   determining with the signal processor a corresponding signal containing information about a pipe wall thickness measurement by decomposing the ultrasonic pulser/receiver signal received in order to identify either peaks using a cepstrum analysis or repeated spacing using a wavelet analysis, based upon the ultrasonic pulser/receiver signal received.

19. A method according to claim 18, wherein the method comprises providing an output signal containing information about the pipe wall thickness measurement.

20. A method according to claim 18, where the method comprises dividing data contained in the ultrasonic pulser/receiver signal received into at least one specific frequency component and at least one defined temporal component in order to detect correct pulses where multiple reflections are caused by irregularities in the surface of the pipe wall being measured.

21. A method according to claim 18, wherein the method comprises determining the pipe wall thickness measurement based at least partly on the time between each pulse detected to give the thickness of the pipe wall.

22. A method according to claim 18, wherein the method comprises correlating wavelets based at least partly on a relationship between the at least one specific frequency component and the at least one defined temporal component.

23. A method according to claim 18, wherein the method comprises pulling true direct reflections out of background noise and multiple odd reflections.

24. A method according to claim 18, wherein the ultrasonic pulser/receiver signal contains information about frequency encode ultrasonic pulses injected in the pipe wall, and the signal processor is configured to use corresponding wavelets to reduce the signal-to-noise ratio in the ultrasonic pulser/receiver signal received.

25. A method according to claim 18, wherein the ultrasonic pulses injected into the pipe wall have a particular frequency.

26. A method according to claim 18, wherein the ultrasonic pulses are injected into the pipe wall from one side.

27. A method according to claim 9, wherein the method comprises performing the cepstrum analysis by processing repeating pulses in the ultrasonic pulser/receiver signal received in order to detect correct pulses where multiple reflections are caused by irregularities in the surface of the pipe wall being measured.

28. A method according to claim 27, wherein the method comprises transforming the ultrasonic pulser/receiver signal received from the time domain into the frequency domain using a Fourier transform into a Fourier transform signal.

29. A method according to claim 28, wherein the method comprises preparing spectral information in the Fourier transform signal so as to provide a prepared transform signal, including performing some combination of using a dc-adjusted power cepstrum to calculate a power spectrum from an output of the Fourier transform; filter a resulting signal with a low pass filter to remove a DC offset; square a resulting filtered signal and take a logarithm of a resulting squared signal.

30. A method according to claim 29, wherein the method comprises transforming the prepared transformed signal using a second Fourier transform so as to provide a second Fourier transform signal.

31. A method according to claim 30, wherein the method comprises performing post processing on the second Fourier transform signal into a post processed signal by filtering the second Fourier transform signal using a bandpass filter, including also squaring a filtered second Fourier transform signal to enhance signal peaks.

32. A method according to claim 31, wherein the method comprises performing peak identification to identify a most probable pipe wall thickness measurement based at least partly on a peak of the post processed signal.

33. A method according to claim 28, wherein the method comprises performing some combination of using a dc-adjusted power cepstrum to separate real portions of an output of the Fourier transform; filter a resulting signal with a low pass filter to remove a DC offset; square a resulting filtered signal and take either a logarithm or a square root of a resulting squared signal to compress peaks in the Fourier transform signal.

34. A method according to claim 28, wherein the method comprises determining a final cepstrum output based at least partly on a highest value or an integration based overall "energy" determination.

35. Apparatus comprising:
means for injecting ultrasonic pulses into a pipe wall from one side, receiving reflected pulses in response to the ultrasonic pulses injected, and providing an ultrasonic pulser/receiver signal containing information about the reflected pulses received;
means for receiving the ultrasonic pulser/receiver signal; and
means for determining a pipe wall thickness measurement by decomposing the ultrasonic pulser/receiver signal received in order to identify either peaks using a cepstrum analysis or repeated spacing using a wavelet analysis, based upon the ultrasonic pulser/receiver signal received.

36. Apparatus according to claim 35, wherein the apparatus comprises means for providing an output signal containing information about the pipe wall thickness measurement.

37. Apparatus according to claim 35, wherein the means for determining comprises means for performing the wavelet analysis by dividing data contained in the ultrasonic pulser/receiver signal received into at least one specific frequency component and at least one defined temporal component in order to detect correct pulses where multiple reflections are caused by irregularities in the surface of the pipe wall being measured.

38. Apparatus according to claim 35, wherein the method comprises means for performing the cepstrum analysis by processing repeating pulses in the ultrasonic pulser/receiver signal received in order to detect correct pulses where multiple reflections are caused by irregularities in the surface of the pipe wall being measured.

* * * * *